FIG.4A
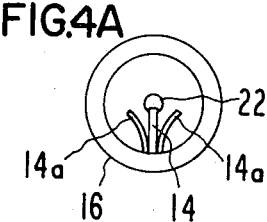 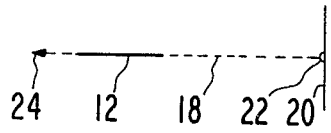 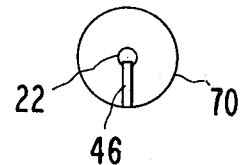
FIG.4B
  
FIG.4C
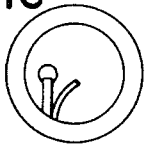  
FIG.4D
  
FIG.4E
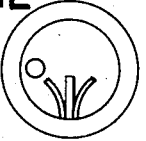 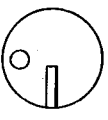
VIEW SEEN BY GUNNER | RELATIVE POSITIONS OF RIFLE, TARGET & EYE | VIEW DISPLAYED TO THE INSTRUCTOR
INVENTOR.
DAVID F. CAPELLARO
BY Townsend and Townsend
ATTORNEYS

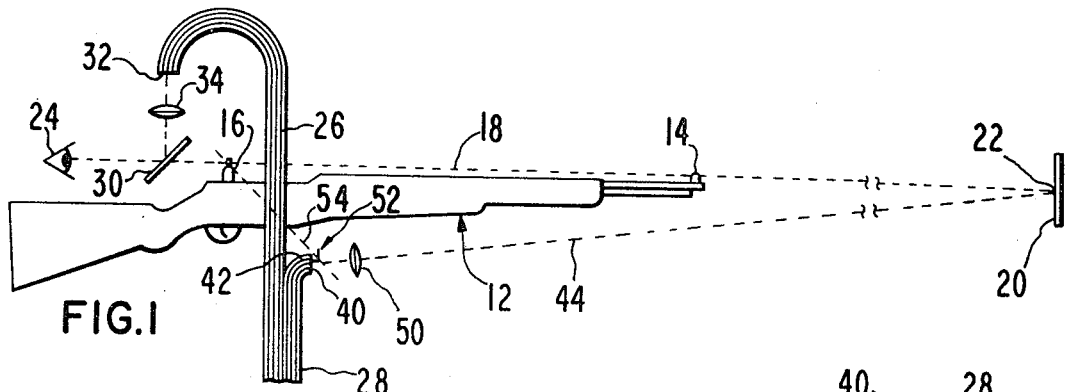
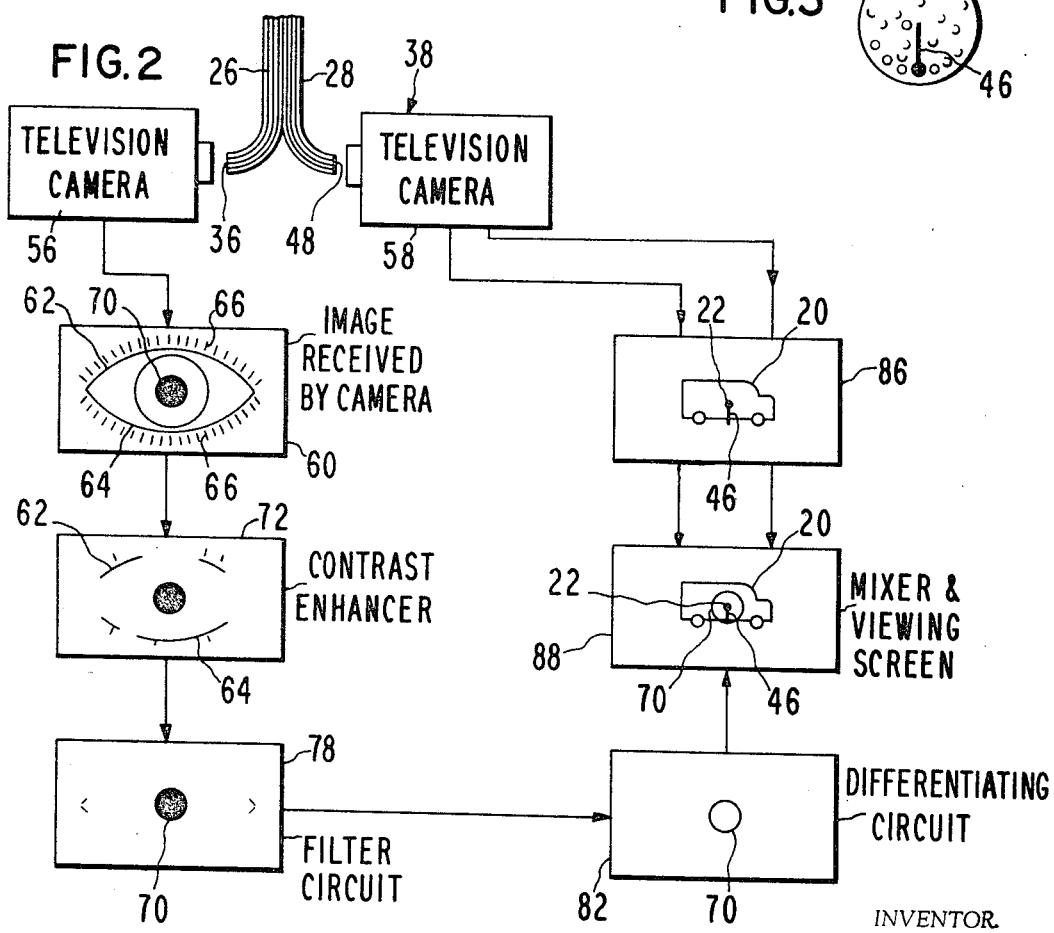

3,453,385
IMAGE DISPLAY APPARATUS AND METHOD FOR ACCURATE AIMING OF A FIREARM
David F. Capellaro, Palo Alto, Calif., assignor to Optics Technology, Inc., Palo Alto, Calif.
Filed Jan. 26, 1966, Ser. No. 523,120
Int. Cl. G01c 9/06; F41g 3/26
U.S. Cl. 178—6.8     13 Claims

ABSTRACT OF THE DISCLOSURE

Apparatus and method for forming an image of the eye and the image of a target when the eye is positioned during the aiming of a firearm with the images being superimposed so as to indicate to an observer the relative positions of the eye and the target with respect to the sight line of the firearm. Thus, the invention is suitable for use during gunnery practice or the like.

---

This invention relates to the handling of a firearm during firing exercises and, more particularly, to apparatus and method for determining accuracy in the aiming of a firearm.

The present invention provides a means for and method of displaying to an observer, by using electro-optical concepts, the field of view seen by an individual aiming a firearm, such as a rifle or the like. The invention is thus suitable for use by a gunnery instructor and a student gunner during training exercises.

In a preferred embodiment, the apparatus for accomplishing this purpose includes a pair of fiber optics bundles adapted to be coupled to the firearm. One of the bundles is used for imaging the student's eye during the aiming of the rifle and the other bundle is used to image the target and to provide a simulated front sight in the target field of view. The images of the eye, simulated front sight and target are transferred by the bundles to an image processing system whereby the images are transformed into electronic signals, the signals are superposed and then used to excite an optical viewing device observable adjacent the firing position. The instructor thus is able to observe the view seen by the student and, since the image on the viewing device indicates the relative positions of the eye and target with respect to the firearm sight line, the instructor may make suggestions or orally instruct the student as to the proper manner of aiming the firearm.

The method of this invention includes the steps of forming images of the eye, the simulated front sight and the target and superposing such images in a manner for viewing whereby errors in the relative positions of the eye, sight line and target which occur during aiming may be readily determined.

In the view seen by a rifleman, the front sight appears fairly well defined in the foreground of the target which will be in focus. The rear sight, however, will be hazy and out of focus. The position of the front sight in the target area depends upon the general accuracy of aiming while the position of the rear sight is critically dependent upon both the aiming and the position of the rifleman's head. Thus, in displaying to an instructor the field of view seen by a student, it is necessary to present a composite image which includes any effects due to misalignment of the rifle sight line and any errors in the location of the rifleman's eye with respect to this sight line. The present invention provides this composite image by the superposition of the eye, simulated front sight and target images in the manner set forth above.

It is therefore the primary object of the invention to provide apparatus for and method of displaying the field of view seen by a gunner during aiming of a firearm, whereby an observer of the display may readily determine errors and advise the gunner what steps are necessary to correct such errors.

Another object of the invention is the provision of image display apparatus of the type described which employs lightweight, flexible fiber optics bundles for transferring the images of the gunner's eye, the firearm sight line and the target onto a viewing device, whereby the aiming of the firearm may be accomplished without interference from cumbersome image transfer structure coupled directly to the firearm while, at the same time, the field of view seen by the firearm user can be readily observed by another individual.

Other objects of this invention will become apparent as the specification progresses, reference being had to the accompanying drawing wherein:

FIG. 1 is a schematic view of a portion of the apparatus of this invention illustrating its use with a rifle aimed in the direction of a target;

FIG. 2 is a block diagram showing the logic of the remainder of the apparatus and optical image representations associated therewith;

FIG. 3 is an end elevational view of one of the fiber optics bundles forming a part of the apparatus; and FIGS. 4a–4e are correlative views seen by the gunner and by an observer of the viewing device forming a part of the apparatus, several of the views illustrating errors normally encountered in aiming a firearm.

The assembly forming the subject matter of this invention is broadly denoted by the numeral 10 and, for purposes of illustration, is adapted for use with a rifle 12 having a front sight 14 and a rear sight 16 defining the sight line 18 thereof. Rifle 12 is illustrated in FIG. 1 as being pointed in the direction of a target 20 specifically at a point 22 thereon so that, when the eye 24 of the rifleman sights along line 18 and the latter passes through point 22, the rifle is properly aimed. If eye 24 is off line 18 or if line 18 does not pass through point 22, the rifle will not be properly aimed. Thus, it is necessary that both the rifle sight line 18 and eye 24 be properly positioned with respect to point 22 in order to achieve firing accuracy.

To display the field of view seen by eye 24 when the latter is in the disposition shown in FIG. 1, apparatus 10 is coupled with rifle 12 and includes a pair of lightweight, flexible fiber optics bundles 26 and 28 mounted in any suitable manner on rifle 12 for movement therewith during a target searching procedure. One end of bundle 26 is disposed to receive the image of eye 24 from a semi-transparent mirror 30 intersecting line 18 and disposed between rear sight 16 and the eye. For purposes of illustration, the end face 32 of bundle 26 is above mirror 30 and the latter is inclined so as to reflect the eye image upwardly. A focusing lens 34 is located between mirror 30 and face 32. The eye image is transferred through bundle 26 to the opposite end face 36 thereof and is received and rendered viewable to an observer by image processing apparatus 38 in a manner to be described.

Bundle 28 has an end face 40 forming an extremity of an elongated portion 42 oriented with its longitudinal axis substantially coincident with an imaginary line 44 which converges to line 18 at point 22. An index mark 46 is affixed in any suitable manner on end face 40 to simulate front sight 14. In effect, therefore, the longitudinal axis of portion 42 simulates rifle sight line 18. Mark 46 is inverted with respect to the normal direction of a rifle front sight to allow for the fact that the image of the scene 20 formed by the lens 50 is inverted by the nature of the imaging process. The image at the opposite face 48 of bundle 28 will therefore bear the correct relationship to the field of view.

Means broadly denoted by the numeral 52 is provided to couple portion 42 of bundle 28 with rear sight 16 so that, upon changing the operative disposition of sight 16, the operative disposition of face 40 with respect to target 20 will also be changed. It is to be noted that rear sight 16 will ordinarily be adjustable to compensate for windage and range. Dashed line 54 (FIG. 1) indicates the coupling between rear sight 16 and portion 42.

The images transferred through bundles 26 and 28 are to be superposed with respect to each other in order to determine errors in the location of sight line 18 and of eye 24 with respect to target 20. This image superposition is accomplished by apparatus 38 wherein a pair of synchronized television cameras 56 and 58 receive the images at faces 36 and 48 and generate a pair of electronic signals having the same time base. The electrical signal representing eye 24 and generated by camera 56 is shown pictorially in block 60 wherein the signal information contains the upper and lower eyelids 62 and 64, eye lashes 66, pupils 68 and iris 70. This signal is directed through an electronic circuit, denoted by the numeral 72 and shown in block form, to enhance the contrast of the central or iris portion of eye 24 and to minimize the contrast of the other portions. The output of circuit 72 is shown pictorially as a blackened circle surrounded by iris 70 and, in this representation, portions of eyelids 62 and 64 remain as extraneous background which is removed by passing the output signal of circuit 72 through a filter circuit denoted by the numeral 78 and shown in block form as being coupled to circuit 72. The output signal of circuit 78, again the blackened circle described above, is directed into and through a differentiating circuit 82, including a phase inverter, shown in block form as being coupled with circuit 78. The output of circuit 82 is shown pictorially as an unblackened circle 84 which corresponds to iris 70 and can now be used to represent rear sight 16, since the latter generally is a ring sight.

The image which is received by camera 58 will also be transformed into an electrical signal, the signal being shown pictorially in block 86 coupled with camera 58. In this pictorial representation, target 20 and mark 46 are superposed inasmuch as the image received by camera 58 is a composite image of these two components. The signal output of circuit 86 as well as the signal output of circuit 82 is directed into a circuit 88 including a mixer which combines these two signals. In addition, circuit 88 is provided with a viewing device which receives the combined signal outputs and renders the same visible. The device may comprise a screen which fluoresces when activated by an electron beam, such as the screen of a two-gun cathode ray oscilloscope. The image observable by the device is shown pictorially within the block denoted by circuit 88 and it is seen that circle 84 is properly oriented with respect to mark 46 and point 22 on target 20. When this orientation results from the aiming of rifle 12, it will be assured that the rifle is properly aimed so that a direct hit on point 22 will be scored.

To illustrate the use of assembly 10, it is assumed that it is to be employed as a training device during firing exercises. It is the purpose of assembly 10 to sense the view seen by a student rifleman and to display such view to an instructor stationed alongside or at a distance from the aiming position. Since bundles 26 and 28 are flexible, apparatus 38 may be positioned in any suitable location.

FIGS. 4a through 4e illustrate the views seen simultaneously by a student and his instructor for various aiming conditions of rifle 12 and eye 24 with respect to target 20. Between each pair of views is a schematic representation in plan view of the relative positions of the eye, the rifle and the target. The view seen by the student includes rear sight 16 in the form of a ring and front sight 14 having wings 14a extending laterally therefrom. Point 22 is shown as a small circle. The view seen by the instructor includes point 22, mark 46 and iris 70.

In FIG. 4a, rifle 12 and eye 24 are properly positioned for a direct hit of point 22 since the latter is centered with respect to rear sight 16 and is directly above the upper extremity of sight 14. Eye 24 and point 22 thus lie on rifle sight line 18. The view displayed to the instructor will, of course, be identical to the view seen by the student.

FIG. 4b illustrates the condition when sight line 18 and point 22 are aligned with each other but eye 24 is out of alignment with sight line 18. In the instructor's view, point 22 and mark 46 will be to the left of center of iris 70, indicating an error in the placement of eye 24 with respect to sight line 18 and point 22. To correct this error, it will be apparent to the instructor that eye 24 must be moved until it is aligned with sight line 18 while rifle 12 is held stationary with respect to point 22. The instructor, after determining this fact, may then convey such information to the student.

FIG. 4c illustrates that eye 24 and front sight 14 are aligned with point 22, but rear sight 16 is misaligned. This will result in both point 22 and mark 46 being to the left of center in the instructor's view with mark 46 being slightly to the left of point 22. To correct this error, rifle 12 must be shifted until sight line 18 is aligned with eye 24 and point 22.

FIG. 4d illustrates that eye 24 and rear sight 16 are aligned with point 22, but front sight 14 is misaligned. The view seen by the instructor for this condition is therefore opposite to the view corresponding to the condition of FIG. 4c. The realignment of rifle 12 is again necessary to correct this error.

FIG. 4e illustrates that eye 24 is on sight line 18 but both are out of alignment with point 22. This represents a target search condition and, as such, is not an aiming error. The view displayed to the instructor shows mark 46 centrally located relative to the circle but the target point 22 is to the side, thus necessitating the aligning of rifle 12 and eye 24 with point 22 in order for the aim to be correct.

The field of view seen by the student through the rear sight is narrow and will change rapidly as he searches for either a stationary or moving target. FIG. 4e is the view seen by the student if he maintains his eye on the rifle sight line and searches for a target which is at the edge of his field of view. Generally, an instructor, during gunnery practice, will find it difficult and fatiguing to follow the movement of the rifle and observe the manner in which the student approaches the firing position unless a relatively wide field of view is displayed to him. Apparatus 38 provides this relatively wide field of view for the instructor while, at the same time, provides adequate resolution and ease of interpreting the narrow field of view seen by the student.

Illumination conditions in the target area must, of course, be adequate for target location and recognition although the ambient illumination at the student's eye may be low. However, if it is desired to improve the contrast between the gunner's eye and its surroundings and between the target and its environment, light intensification structure may be employed at the entrance ends of bundles 26 and 28. For example, the resolution requirements for this purpose can be achieved by using a simple diode image intensifier giving a flux gain of 10–20× and resolving power of about 20–25 lines/mm.

While the foregoing description relates to accuracy determination in the aiming of rifle 12, it is clear that the overall system of this invention may be utilized to observe the student's reaction to the firing of rifle 12, his state of relaxation during sighting and other factors pertinent to correct aiming procedures.

While one embodiment of this invention has been shown and described, it will be apparent that other adaptations and modifications can be made without departing from the true spirit and scope of the invention.

What is claimed is:

1. An aim display assembly for a firearm comprising: a viewing device for receiving a pair of optical images and simultaneously displaying the same; first means adapted to be coupled with the firearm for receiving an optical image of the firearm user's eye referenced to the firearm sight line when the eye is in an aiming disposition with respect to the firearm and for transferring said eye image to said viewing device; and second means adapted to be coupled to said firearm for receiving an optical image of a target when referenced to said firearm sight line and for transferring said target image to said viewing device, whereby the positions of the eye and target with respect to the firearm sight line may be viewed on said viewing device to determine the aiming relation of the firearm with respect to the eye and target.

2. An aim display assembly as set forth in claim 1, wherein is included means coupled with said second means for simulating a front sight of the firearm, said second means being disposed to simultaneously receive the images of said target and said simulating means and to direct the same as a composite image to said viewing device.

3. An aim display assembly as set forth in claim 1, wherein said first means and said second means each includes a fiber optics bundle.

4. An aim display assembly as set forth in claim 1, wherein said first means includes a semi-transparent mirror adapted to be disposed across the firearm sight line for reflecting the eye image transversely of said sight line, and a fiber optics bundle disposed to receive the reflected eye image and to direct the same to said viewing device.

5. An aim display assembly as set forth in claim 1, wherein said second means includes a fiber optics bundle having an elongated end portion disposed with its longitudinal axis substantially convergent with said firearm sight line at said target when said bundle is coupled with the firearm.

6. An aim display assembly as set forth in claim 1, wherein said second means includes a fiber optics bundle having an elongated end portion defining an image-receiving face and means on said face defining a simulated front sight, said end portion being disposed with its longitudinal axis substantially convergent to said firearm sight line at said target, said end face being substantially perpendicular to said longitudinal axis.

7. An aim display assembly as set forth in claim 1, wherein said second means includes a fiber optics bundle having a front face for receiving said target image, and including means for coupling said bundle to said rear sight of the firearm for changing the operative position of said front face in response to changes in the operative disposition of said rear sight.

8. An aim display assembly as set forth in claim 1, wherein said device includes a television system.

9. A method of determining the aiming relation of a firearm with respect to the firearm user's eye and a target comprising the steps of: forming an optical image of the firearm user's eye referenced to the firearm sight line when the eye is in an aiming disposition; forming an optical image of a target reference to said sight line; and simultaneously displaying said images.

10. A method of determining the aiming relation of the sight line of a firearm comprising the steps of: forming an optical image of the firearm user's eye referenced to the firearm sight line when the eye is in an aiming disposition; forming a composite optical image of a simulated front sight of the firearm and a target referenced to said sight line; superposing said images; and viewing said superposed images.

11. A method as set forth in claim 10, wherein said step of superposing said images includes transforming said optical images to respective electrical signals and directing said signals into coupled relationship to a visual indicator.

12. Apparatus for determining the aiming relation of the sight line of a firearm with respect to the firearm user's eye and a target with the sight line being defined by and extending between a front sight and a rear sight, said apparatus comprising: first means coupled with the firearm for producing an optical image of the firearm user's eye when the eye is rearwardly of said rear sight and in an aiming disposition relative to said sight line; second means including a simulated front sight and adapted to be coupled with the firearm for producing a composite optical image of said simulated front sight and a target referenced to said sight line; means coupled with said first means and said second means for receiving said images and transforming the same into respective electrical signals; and viewing structure responsive to electrical signals and coupled with said apparatus for receiving said electrical signals therefrom and optically displaying the information in said electrical signals, whereby the eye may be used to simulate the firearm rear sight and the view displayed by said structure will impart to an observer the relationship between the firearm sight line, the eye and the target when the firearm is being aimed.

13. Apparatus as set forth in claim 12, wherein each of said first means and said second means includes a fiber optics bundle having an entrance end, and wherein is provided light intensification structure for each bundle respectively, each structure being disposed adjacent to the entrance end of the corresponding bundle.

References Cited

UNITED STATES PATENTS

| | | | |
|---|---|---|---|
| 1,277,932 | 9/1918 | Hollifield | 35—25 |
| 2,268,113 | 12/1941 | Fidelman | 35—25 |
| 2,331,616 | 10/1943 | Minghetti | 35—25 |
| 2,912,494 | 11/1959 | Flint. | |
| 2,968,877 | 1/1961 | Becher | 35—25 |

ROBERT L. GRIFFIN, Primary Examiner.

JOSEPH A. ORSINO, JR., Assistant Examiner.

U.S. Cl. X.R.

35—25; 356—247